(12) United States Patent
Vorobyov et al.

(10) Patent No.: US 10,825,236 B1
(45) Date of Patent: Nov. 3, 2020

(54) COMPOSITE MESH LOD CONSTRUCTION

(71) Applicant: ARVIZIO, INC., Ottawa (CA)

(72) Inventors: Borys Vorobyov, Ottawa (CA); Oleksandr Karpenko, Ottawa (CA); Iurii Monastyrov, Ottawa (CA); Ievgenii Bielkin, Ottawa (CA); Vitalii Monastyrov, Ottawa (CA)

(73) Assignee: Arvizio, Inc., Ottawa (CA)

( * ) Notice: Subject to any disclaimer, the term of this patent is extended or adjusted under 35 U.S.C. 154(b) by 0 days.

(21) Appl. No.: 16/299,906

(22) Filed: Mar. 12, 2019

Related U.S. Application Data

(60) Provisional application No. 62/642,190, filed on Mar. 13, 2018.

(51) Int. Cl.
  *G06T 15/20* (2011.01)
  *G06F 3/01* (2006.01)
  *G06T 19/00* (2011.01)

(52) U.S. Cl.
  CPC ............ *G06T 15/20* (2013.01); *G06F 3/013* (2013.01); *G06T 19/006* (2013.01); *G06T 2210/36* (2013.01)

(58) Field of Classification Search
  None
  See application file for complete search history.

(56) References Cited

U.S. PATENT DOCUMENTS

| | | | |
|---|---|---|---|
| 2008/0195655 A1* | 8/2008 | Kondou | G06T 13/00 |
| 2018/0122139 A1* | 5/2018 | Janzer | H04W 4/02 |
| 2018/0314921 A1* | 11/2018 | Mercep | G01S 13/87 |

(Continued)

*Primary Examiner* — Frank S Chen
(74) *Attorney, Agent, or Firm* — Aventum IP Law LLP

(57) ABSTRACT

A method of forming and using an efficient image data structure involves providing a first model comprising three-dimensional spatial information for use in being displayed on a display device. Objects within the first model having sub-models are classified to form groups of objects, objects within a same group for being processed with a substantially similar process. A class LOD structure is constructed for each group, the class LOD structure built using the substantially similar process for the class and the LOD structure for representing each object within the class for supporting rendering thereof. A rendering strategy is defined for each Class, the rendering strategy for rendering each object within the class based on data within the LOD structure and in dependence upon a gaze direction of a spectator and a location of the spectator. The class LODs are merged to form an LOD structure for the first model. The LOD structure is stored in a retrievable form for having data retrieved therefrom based on a provided location and gaze direction. Based on the spectator location and gaze direction a subset of LODs is selected from the LOD structure relying on a predefined set of integer functions that define rendering strategies, each for a subset of the class LODs reflecting each class, the subset of LODs selected in part based on a distance from the spectator location to an object within said class. A subset of facets is selected from the subset of LODs depending on spectator position and related to visibility of an encompassing sub-model for use in rendering of a scene on a front-end display. The subset of selected facets is then provided for display on the front-end device.

19 Claims, 15 Drawing Sheets a b

(56) References Cited

U.S. PATENT DOCUMENTS

2018/0342100 A1* 11/2018 Mollis ................... G06T 15/205
2018/0350406 A1* 12/2018 Lodato ................. H04N 13/366
2018/0352272 A1* 12/2018 Breitenfeld ............ G11B 27/34
2019/0278293 A1*  9/2019 Levinson ............... G05D 1/024
2019/0278995 A1*  9/2019 Mine ..................... G06F 3/0346

* cited by examiner

COMPOSITE MESH LOD CONSTRUCTION

The present invention claims priority from U.S. Provisional Patent Application Ser. No. 62/642,190 filed on Mar. 13, 2018, the entire contents of which are incorporated herein by reference.

FIELD

The invention relates to video graphics and more particularly to displaying data in a virtual reality or augmented reality environment.

BACKGROUND

Virtual reality and augmented reality both rely on three-dimensional spatial models. In augmented reality, a user's movement allows them to change their perspective and location for viewing digital image data within an actual space. Examples of augmented reality solutions include HoloLens™ from Microsoft® and the headset of Magic Leap®.

There are several limitations on augmented reality hardware. First, current models cannot consume vast quantities of data that are necessary to render scenes in real-time in response to user motion; the vast quantity of data is very difficult to transfer to and/or from an augmented reality headset. Second, processing of the vast quantities of data is difficult even with cutting edge processors. Third, battery life in headsets is typically limited; faster processing and additional processing resources result in additional battery power consumption reducing headset functionality.

In an ideal world, different models are made of different objects. The models are then located and oriented within a scene and are then concatenated or stored in a structure to support rendering. During use, the models are each placed within the space in accordance with their location and orientation and each are displayed as is appropriate for a user's location and orientation of gaze. Unfortunately, each of these models may comprise millions of polygons resulting in a huge amount of data transfer and data processing.

This problem is easily explained with an example. If car models are developed, each with 5 million polygons, then placement of 10 cars within a scene would require uploading of 50 million polygons to a headset for processing. Clearly, as real-world scenes with dozens of cars and other objects are created, the problem becomes more and more untenable, both in terms of data transfer and data processing.

To solve this problem, it has been proposed that the overall data set be decimated. Relying on decimation, the dataset is filtered to remove a predetermined percentage of facets or to limit proximate facets within a model in order to limit the dataset to a manageable size. Unfortunately, decimating the data set will affect quality of rendering in some situations. Thus, decimating is not universally beneficial. Further, decimating the data is often best performed in a gaze dependent fashion, where data is decimated from a known gaze vantage. For example, given that the headset is limited to point A as a location, one can decimate a model based on distance, perspective, and obfuscation—line of sight. With augmented reality headsets, movement and gaze redirection are inherent in their purpose. Therefore, decimation must account for every location and gaze orientation. Thus, decimation has many drawbacks and few advantages other than supporting a workable solution.

Limiting data for processing without significantly compromising rendering quality would be highly advantageous.

SUMMARY

In accordance with the invention there is provided a method comprising: providing a first model comprising three-dimensional spatial information for use in being displayed on a display device; classifying objects within the first model to form groups of objects, objects within a same group for being processed with a substantially similar process; building a class LOD structure for each group, the class LOD structure built using the substantially similar process for the class and the LOD structure for representing each object within the class for supporting rendering thereof; defining a rendering strategy for each Class, the rendering strategy for rendering each object within the class based on data within the LOD structure and in dependence upon a gaze direction of a spectator and a location of the spectator; merging the class LODs to form an LOD structure for the first model; and storing the LOD structure in a retrievable form for having data retrieved therefrom based on a provided location and gaze direction.

In some embodiments, the first model comprises multiple types of image data.

In some embodiments, processing to simplify comprises at least one of decimation, generalisation, substitution, and elimination.

In some embodiments, merging comprises automatically merging the class LOD structures for each class to a viewable model represented by data structures containing an array of containers having a dimension equal to a number of classes and wherein a data structure relating to each class contains references to all sub-models belonging to said class.

In accordance with another embodiment, there is provided a method comprising: providing a first model represented in a first LOD data structure; receiving a spectator location and a spectator gaze direction of a user of a front-end device; based on the spectator location and spectator gaze direction selecting a subset of LODs from the first LOD data structure relying on a predefined set of integer functions that define rendering strategies, each for a subset of the LODs reflecting each class, the subset of LODs selected in part based on a distance from the spectator location to an object within said class; selecting a subset of facets from the subset of LODs depending on spectator position and related sub-model visibility for use in rendering of a scene on the front-end display; and providing the subset of selected facets for display on the front-end device.

In accordance with another embodiment there is provided a method comprising: providing a first model comprising three-dimensional spatial information for use in being displayed on a display device; classifying objects within the first model having sub-models to form groups of objects, objects within a same group for being processed with a substantially similar process; building a class LOD structure for each group, the class LOD structure built using the substantially similar process for the class and the LOD structure for representing each object within the class for supporting rendering thereof; defining a rendering strategy for each Class, the rendering strategy for rendering each object within the class based on data within the LOD structure and in dependence upon a gaze direction of a spectator and a location of the spectator; merging the class LODs to form an LOD structure for the first model; storing the LOD structure in a retrievable form for having data retrieved therefrom based on a provided location and gaze direction; receiving a spectator location and gaze direction; based on the spectator location and gaze direction selecting a subset of LODs from the LOD structure relying on a predefined set of integer functions that define rendering strategies, each for a subset of the class LODs reflecting each class, the subset of LODs selected in part based on a distance from the spectator location to an object within said class; selecting a subset of facets from the subset of LODs depending on spectator position and related to visibility of an encompassing sub-model for use in rendering of a scene on a front-end display; and transmitting the subset of selected facets for display on the front-end device.

In accordance with another embodiment there is provided a method comprising: measuring a spectator location and gaze direction; providing the spectator location and gaze to a server; receiving from the server displayable object data relating to a plurality of displayable objects with rendering information relating to each displayable object; rendering displayable image data in dependence upon the displayable object data and the associated rendering information based on the spectator location and gaze direction; and displaying the rendered displayable image data on a front-end device.

In accordance with another embodiment there is provided a method comprising: providing a first model comprising three-dimensional spatial information for use in being displayed on a display device; classifying objects within the first model having sub-models to form groups of objects, objects within a same group for being processed with a substantially similar process; building a class LOD structure for each group, the class LOD structure built using the substantially similar process for the class and the LOD structure for representing each object within the class for supporting rendering thereof; defining a rendering strategy for each Class, the rendering strategy for rendering each object within the class based on data within the LOD structure and in dependence upon a gaze direction of a spectator and a location of the spectator; merging the class LODs to form an LOD structure for the first model; storing the LOD structure in a retrievable form for having data retrieved therefrom based on a provided location and gaze direction; receiving a spectator location and gaze direction; based on the spectator location and gaze direction selecting a subset of LODs from the LOD structure relying on a predefined set of integer functions that define rendering strategies, each for a subset of the class LODs reflecting each class, the subset of LODs selected in part based on a distance from the spectator location to an object within said class; selecting a subset of facets from the subset of LODs depending on spectator position and related to visibility of an encompassing sub-model for use in rendering of a scene on a front-end display; and providing the subset of selected facets for display on the front-end device.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS

Figure 1:
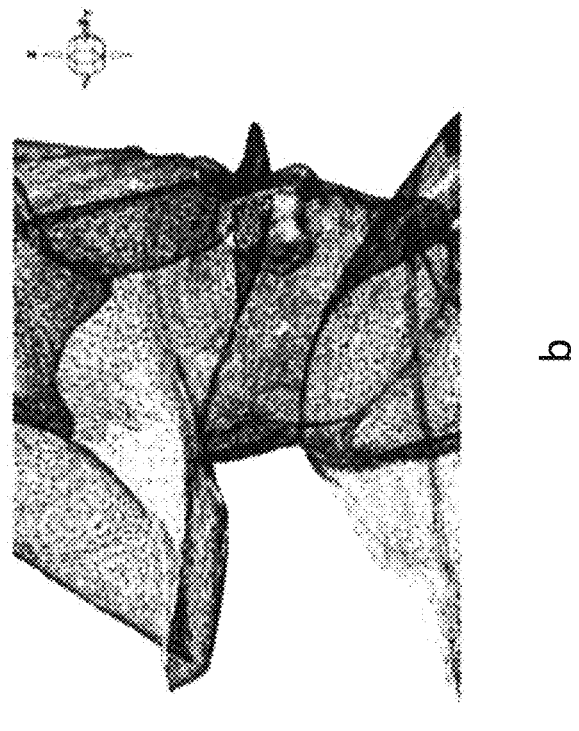
FIG. 1 is a point cloud showing at (a) an object as a plurality of points in three-dimensional space and its mesh representation shown at (b)
Figure 1:
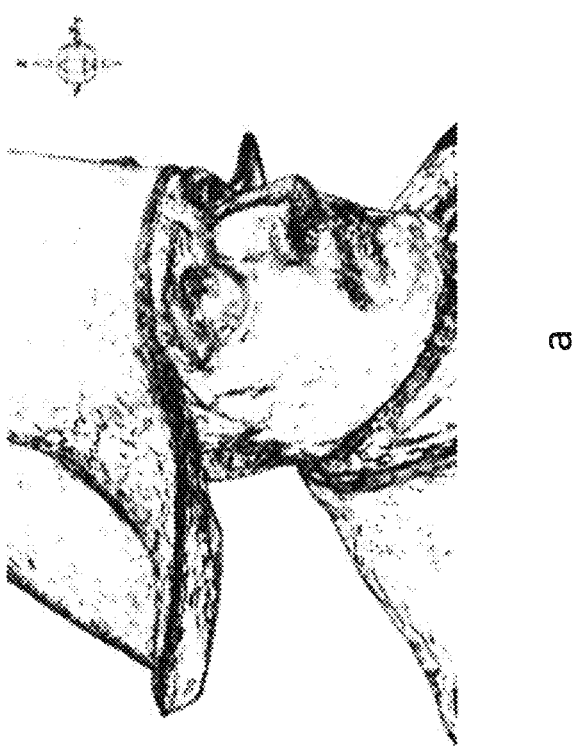

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed but is to be accorded the widest scope consistent with the principles and features disclosed herein.

DEFINITIONS

LOD (Level Of Details) is a general design term usually used in a video game landscapes in which closer objects are rendered with more polygons than objects that are farther away. LOD are often dictated by system requirements and in an ideal case an LOD process automatically adjusts to hardware limitations. In other words, improved hardware parameters should naturally lead to better user experience without significant changes.

PYRAMIDAL model is a general design term usually used in a video game landscapes; it defines a model assembled from a set of LODs. Using a pyramidal structure, one may design a model in an optimal way depending on the spectator position using the appropriate LOD levels.

SPATIAL MODEL is a digital model represented as data file which contains all spatial, topological and visual characteristics of a model for its display at graphical devices.

MESH MODEL is a spatial data model which represents a geometric object as a set of (usually connected) flat finite polygonal objects (facets). Mesh data is widely used in engineering, design, architecture etc. Meshes are subject to decimation, a process which reduces number of facets in the representation of mesh model. Mesh model may contain few disconnected sub-meshes (sub-models), and so can be either a single-object model or a multi-object model containing several sub-meshes.

DECIMATION of a mesh model is a process of simplifying parts of a mesh model or the whole mesh model by reduction of number of facets to a certain pre-defined number within a region with minimum possible distortion of model shape. Relying on decimation and facet limits allows for building LOD levels of a part of a model or of a model. Parts of a model are assemblable into a structure for the complete model.

2-DIM and 3-DIM RASTER DATA MODEL is a spatial data model that represents a geometric object as a set of regularly distributed spatial nodes in 2D or 3D, each with a value of certain parameter defined. Raster data is widely used in various applications, i.e. in photography, engineering, description of natural phenomena etc.

POINT CLOUD is a set of spatially distributed irregular data points in some coordinate system. In a three-dimensional coordinate system, X, Y, and Z coordinates usually define the position of each point. Often point cloud is intended to represent the external surface of an object. Various semantic data (like color, intensity etc.) can be also associated with each point in a point cloud. In most of the cases point clouds result from laser scanning. They can be also produced out of photogrammetry data.

GRAPHS is a spatial structure amounting to a set of objects in which some pairs of the objects are in some sense "related." The objects correspond to mathematical abstractions called vertices (also called nodes or points) and each of the related pairs of vertices is called an edge (also called an arc or line). Typically, a graph is depicted in diagrammatic form as a set of dots for the vertices, joined by lines or curves for the edges. Graphs are used in mathematical and economical modelling, network analysis, etc. since they naturally represent topology of abstract objects and allow effective resolution of many optimization problems.

STRUCTURED MODEL is a subject to structuration where few levels of model detailing can be naturally defined.

VECTOR STRUCTURE is a representation of geometric objects using points, lines, and polygons. Vector models are useful for storing data that has discrete boundaries, such as country borders, land parcels, and streets.

DECOMPOSITION of a model is a process of dispensing model parts between different LOD layers to process them later independently.

STRUCTURATION of a model is a process of assigning a certain hierarchical level to each part of a model and of associating each part with certain LOD or LODs.

CLASSIFICATION of a model is a process of classifying of parts of a model by using associated semantics or geometry and associating certain classes with certain LOD procedures of LOD construction COMPOSITION of a model is a re-combination of originally separated or decomposed parts of a model in a different way and forming the new part(s) suitable for further operations. Classification of geometry (manual, semi-manual or automated) may be required as a prerequisite for composition.

SUBSTITUTION is a process of assigning pre-defined, often simplistic, objects instead of their native analogues at lower LOD levels. In certain cases, and for lower LODs, complex objects or group of objects are substituted by a simplified pre-defined single object—primitive—introduced in accordance to a predefined procedure. Textures taken from an original native object are sometimes overlaid over a primitive to minimize visual differences.

ASSEMBLING is a process of construction of a viewable model from pre-built LOD levels taken from pre-classified and recomposed model.

COMPOSITE MESH is a mesh containing several LOD representations of each sub-mesh with rules of depiction built into it. Depending on spectator distance and/or gaze towards each sub-mesh included in the model, a mesh is displayed with different LOD level, so models are displayed with different LOD levels simultaneously providing a satisfactory user experience and effective usage of available resources.

SEMANTICS is a data model in which semantic information is included. This means that a model describes the meaning of its instances. A semantic data model is an abstraction defining how stored symbols, instance data, relate to the real world. Semantics may describe an object within a model. By way of example, semantic may include belonging to some part of machine or construction or human body (i.e. "transmission" or "pipe" or "cardio-vascular") or refer to material or another physical characteristic.

MIXED REALITY (MR) and AUGMENTED REALITY (AR) devices are front-end devices that provide the blending of the physical and digital worlds.

In contemporary engineering, construction, mining, utility management, medicine and many other areas usage of 3D spatial digital models has become a design and presentation standard. All mentioned markets operate with thousands of spatial models and interchange them when required. In most cases content interchange formats are facet-based, in other words before being pushed to an AR/MR device, 3D-models are converted to polyhedrons with triangular facets.

To be displayed at an AR/MR wearable device with limited resources, a number of facets in mesh-based models must be reduced to within limits dictated by constraints of the AR/MR wearable device. Although limitations imposed by each device vary, even the most powerful ones will not allow loading of actual size industrial and/or environmental models that often contain tens of millions of facets. In contrast, limitations for the most advanced contemporary wearable devices are between 200,000 and 1 million facets.

A well-known approach to model size reduction is referred to as "decimation," where one either gradually deletes some edges and/or vertices of a mesh or one substitutes certain subsets of facets with another subset approximating the original subset but having less facets. Preferably, the limits inevitable distortion to an original model shape in accordance with predetermined metrics. There are various methods of decimation and various methods of determining metrics for deviation assessment; however, decimation methods in principle are only directly applicable to relatively uniform models. Referring to FIG. 1, shown is a model of a Napoleon statue model (a) and its mesh approximation (b) as an example of uniform models.

A principal quality of a uniform model is its support for same parameters of LOD construction for the whole model at one time. A uniform model allows for application of a single process to the entire model. So using mesh reduction levels (LODs), a model is displayed fully with lower LODs or partially from higher LODs.

At the same time, even for uniform mesh-based models, there is little consideration of a position of a spectator's gaze towards the model causing distanced parts to be shown from a same LOD as nearby parts. This may downgrade a quality of display.

Arranging data in a hierarchical fashion that is substantially uniform in arrangement as opposed to resolution or data volume is advantageous. In such a system, data is stored hierarchically—lower resolution data at a first level and higher resolution information at a second other level, etc. Thus, data is provided to a headset in dependence upon a viewable resolution that only relates to visibility and distance. Closer objects are represented by higher resolution levels of a dataset and further objects are represented by lower resolution levels of the dataset.

An exemplary method for arranging the data is presented hereinbelow. The method is applicable to large datasets, to amalgamations of data and even to amalgamation of data of various types of 3D spatial data models including but not limited to meshes, point clouds, 2-dim and 3-dim raster data, graphs, and vector structures. Relying on the method, a system processes data in a fashion that makes 3D spatial data files viewable at a device with limited video processing and random-access memory (RAM) resources. This is independent of whether size of native 3D spatial data files repeatedly exceeds device resources or not. The method is applicable for various augmented reality (AR) and mixed reality (MR) devices that have strict resource limitations being untethered and wearable.

Figure 2:
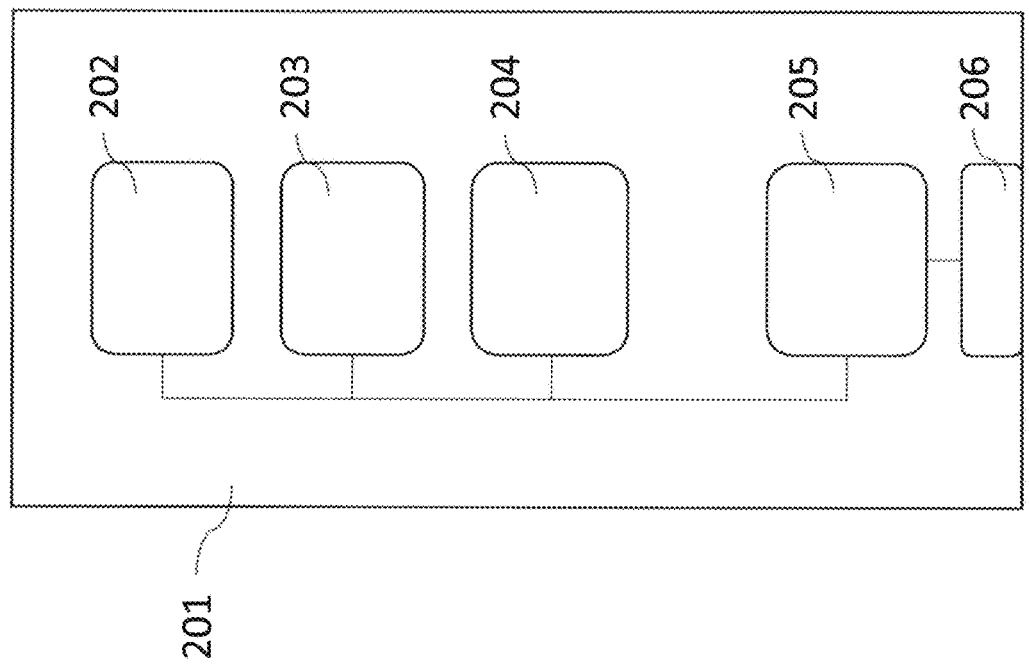
FIG. 2 is a simplified block diagram of a computer system.

Referring to FIG. 2 shown is a computer system. Computer system 200 comprises a processing unit 201 including RAM 202, ROM 203, a processor 204, communication circuitry 205, and I/O ports 206. The computer system shown is a server for operating without a user physically present at the device and is therefore shown without display, keyboard, and pointing device. In operation, computer 200 receives data and processing requests via a network and performs the processing on the data as requested.

Figure 3:
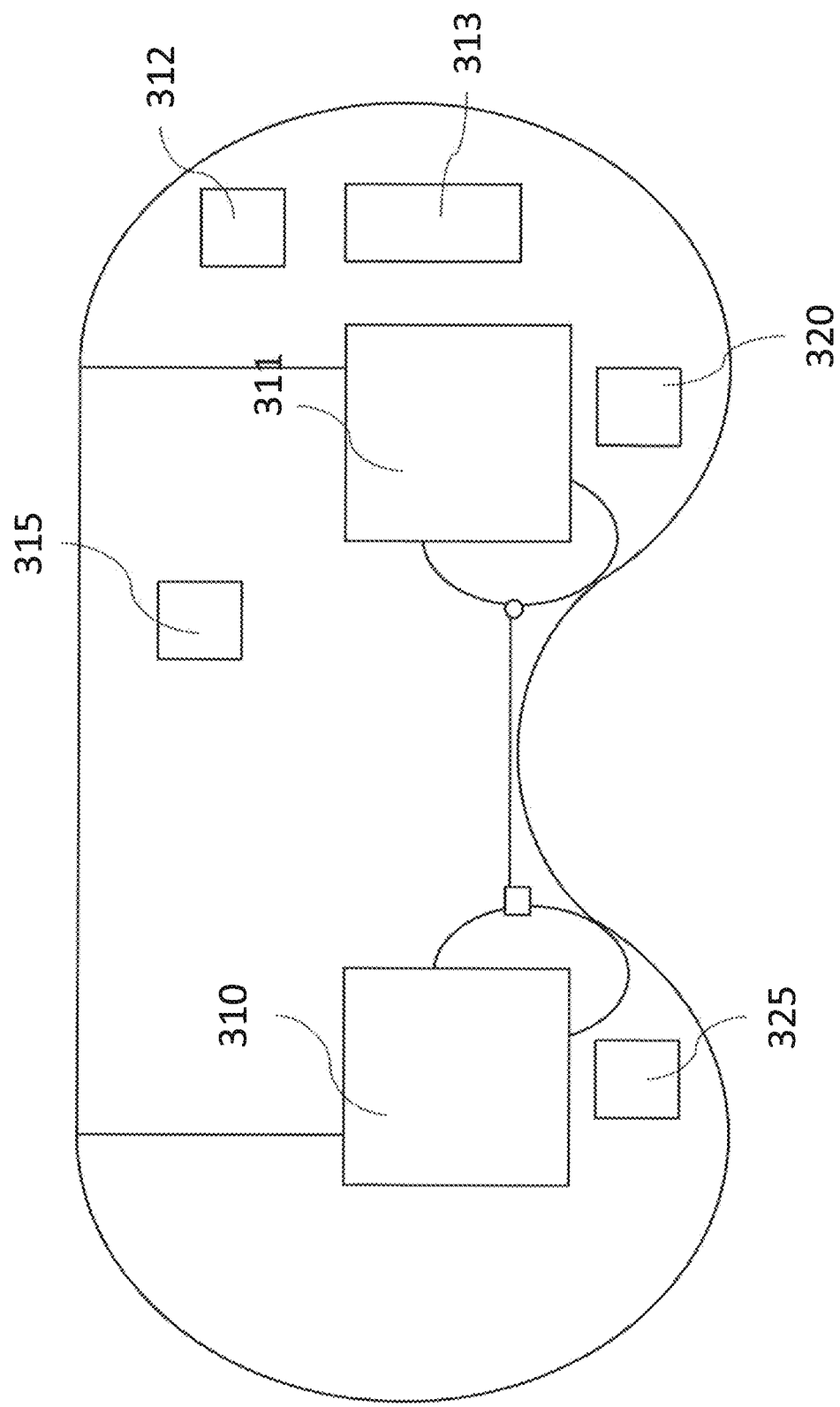
FIG. 3 is a simplified block diagram of a heads up display.

Referring to FIG. 3 shown is an AR headset. The headset comprises a first display 310, a second display 311, a processor 312, a battery 313, a communication circuit 315, RAM 315, location circuit 320, and gaze circuit 325. In use, the processor processes data within the RAM and displays results of processing on the first display 310 and on the second display 311. The processing relies on data from the location circuit 320 and from the gaze circuit 325.

Figure 4:
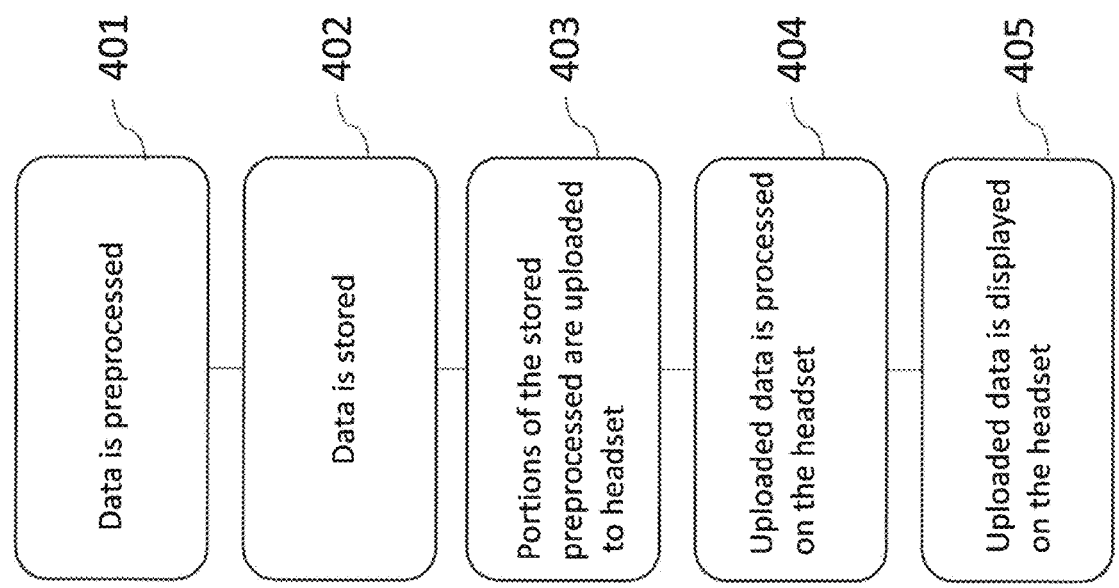
FIG. 4 is a simplified flow diagram of a method for data visualization including data preprocessing.

Referring to FIG. 4, a simplified method for data visualization including data preprocessing is shown. At 401, data is preprocessed. At 402, the preprocessed data is stored. At 403, portions of the stored preprocessed data are then uploaded to a headset, processed on the headset at 404, and then, at 405, displayed defining basic principles of viewable spatial model construction and usability.

In the present embodiment, preprocessing of the data begins with decomposing an original multi-object model into groups (classes) in a way that all sub-models in each group are then processed with a same process. Once groups are defined, one of more LOD sets is constructed for each group. This is performed such that depending on spectator's position across a 3D scene, a best possible representation of the model or group from the appropriate LOD level is formed. Simultaneously, data is stored such that fine details of the model are not subject to significant distortion at high resolution close up. Then, the LODs for different groups are merged into a viewable model. Optionally, this group assembly allows 3rd-party LODs to be added to the viewable model.

During display, a subset of the viewable model is selected based on gaze and location. The subset is selected based on gaze and a level of detail of LOD is selected based on distance. In this way, only a small amount of data transfer and processing is utilised to render the image data onto the headset displays with a desired accuracy.

Figure 5:
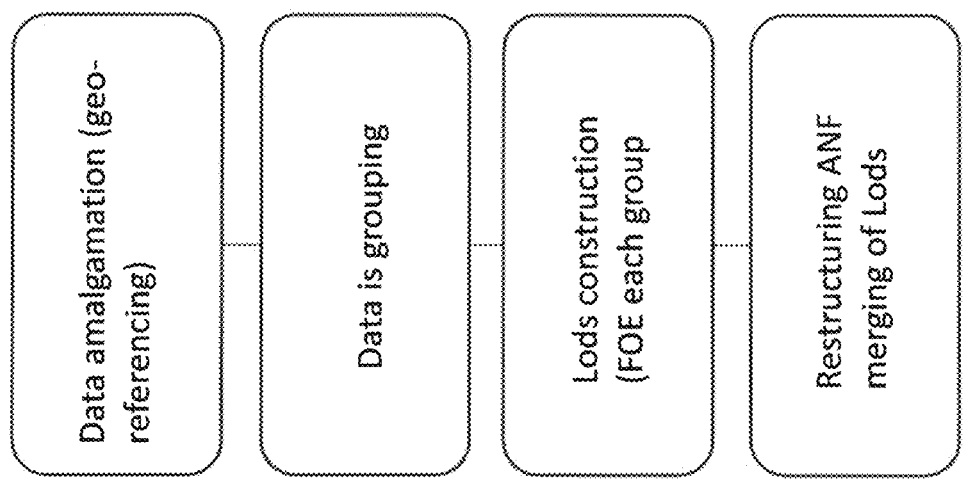
FIG. 5 is a simplified flow diagram of a method for data preprocessing.

Referring to FIG. 5, shown is a method data preprocessing. Data from various sources is received and amalgamated by associating with each data set a location and orientation such that they relate spatially one to another. The data are then all within a global and consistent co-ordinate space even if each data source provides data in a different resolution, format, and/or co-ordinate space. The data is then processed according to the following steps:

Decompose all original multi-object models into groups—classes—in a way where sub-models in each group are processed in a same fashion. Each group—class—is associated with every object of that group across multi-object models. Elements within a single group need not be identical, they need only be grouped in accordance with the process.

One or more LOD sets is constructed for each group. Depending on spectator's position across a 3D scene, a representation is selected of a model from the appropriate LOD level. The selected representation is able to show a whole model of an object for each object in the group without visible geometric distortions. The LOD is constructed such that groups are hierarchical and objects within groups at a lower level have a higher resolution.

Pre-built set(s) of LODs are merged into a viewable model. This includes assembling 3rd-party data sets or LODs into the viewable model. At this point, a data set architecture results that supports lower communication bandwidth to communicate image information to a display device and reduced processing requirements.

The method for grouping of the objects is optionally based on the data format. For example, when all image data is of a same data format, depending on the data type different processes for LOD construction are useful as outlined in table 1. Of course, for composite data structures, a more efficient resulting dataset occurs when the data is converted into a single set of groupings. That said, this is not necessary and oftentimes is of limited additional benefit.

TABLE 1

| Data type | Methods of pre-processing | Type of pre-processing | Result of pre-processing |
| --- | --- | --- | --- |
| 1 UNIFORM MESHES | decimation | Automated | LOD mesh, composite mesh |
| 2 RASTER DATA | generalization | Automated | LOD Grid |
| 3 POINT CLOUD | generalization | Automated | Point octo-pyramid |
| 4 GRAPHS | semi-automated | Substitution | Simplified graph |
| 5 VECTOR STRUCTURES | automated | Screening | LOD vector structures |
| 6 STRUCTURED MODEL | semi-automated | Classification, decomposition, composition, structuring, substitution, decimation | Various model structures depending on model content |

Relying upon various LODs having different characteristics and formats allows for merging of existing image datasets even when provided from different sources. Processing non-uniform models in a way where applicable for displaying various parts of the model depending on gaze and position in an effective and efficient way to support display on head mounted battery-operated devices is desirable. Even for uniform mesh-based models with only one LOD structure for whole model, a more efficient result is achievable with preprocessing of the LOD data.

Figure 6:
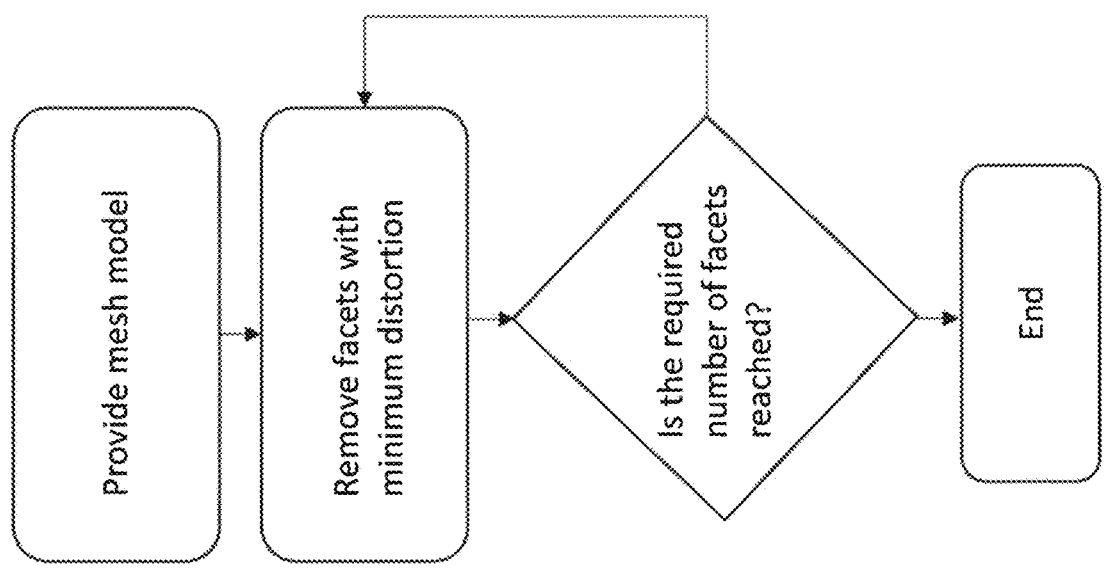
FIG. 6 is a simplified flow diagram for a method of LOD construction.

Referring to FIG. 6, shown is a method of LOD construction for multi-structural mesh models. In industry and engineering, models are typically not uniform and not always mesh-based. The models may contain various parts with significant diversification of their shapes, types, patterns, space distribution and importance for various work-flows. Further, parts may be represented by models produced with different tools and in different formats. A total number of facets in the models may reach tens of millions of facets, requiring significant reduction and further LOD organization for effective display at a wearable device. Returning to the car example, each part of the car may be represented by a separate high-resolution model and all models are then assembled to form a model of the car. Some parts are scanned, others have models generated and from which the parts are made, and so forth. Thus, the assembled model for the car is not uniform.

A decimation processes applicable for uniform mesh-based models, as shown in FIG. 6, may not work for multi-structural mesh-based models and is not applicable for many other data types. Even when applied across non-uniform mesh-based models, decimation processes sometimes lead to very serious deformations or even failure of a resulting model.

Three different processes to reduce a number of facets with minimum distortion to model shape and structure are presented as examples. It is worth considering that various parts of models are: subject to decimation—a set of parameters used for each part or each class of parts varies; subject to generalization—a set of parts may be substituted with some other objects or set of objects in accordance with certain rules; and subject to elimination—some parts won't be displayed within certain LODs.

Figure 7:
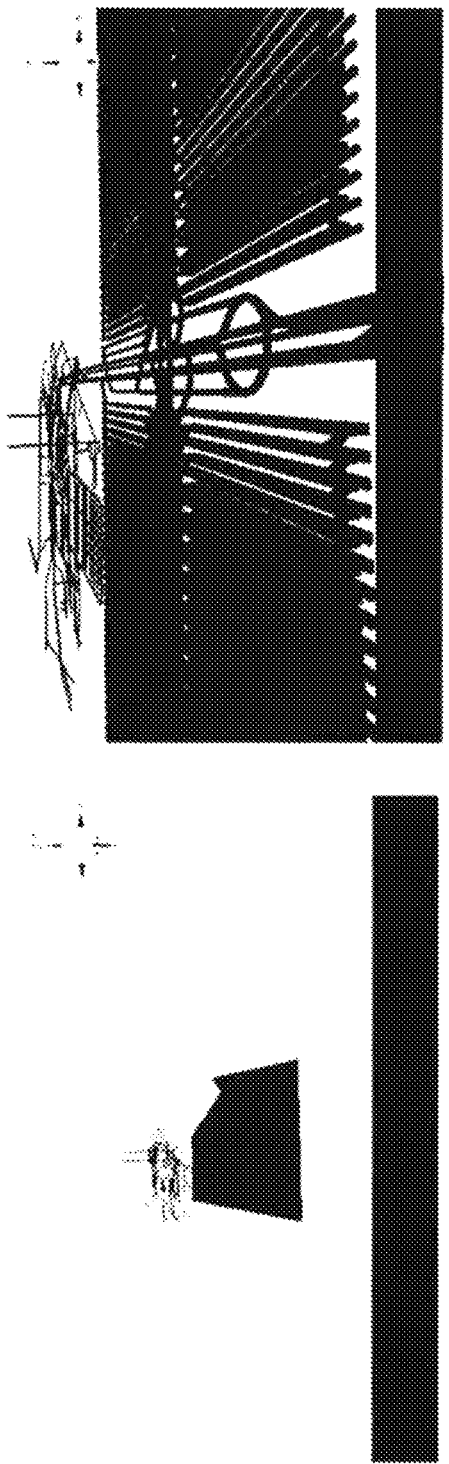
FIG. 7 is an example of model generalisations showing an underground mine.

Referring to FIG. 7, one sees an example of model generalization: a model of an underground mine is presented by a black polygon at the left—generalized level—for viewing from a distance and with detailed geometric shapes—higher level of details—in a close-up view.

Figure 8:
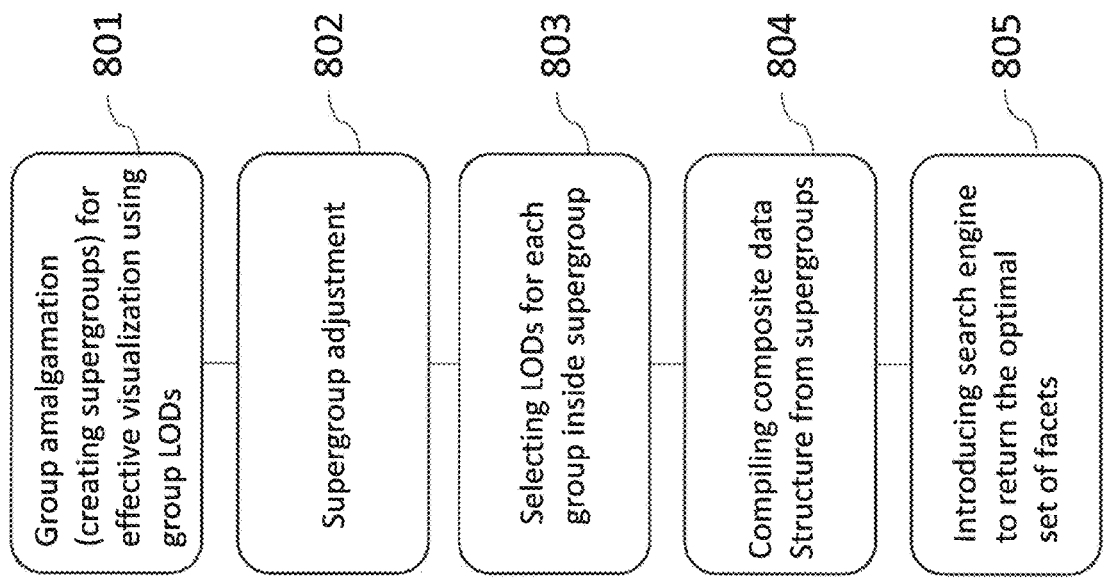
FIG. 8 is a simplified flow diagram of LOD construction.

Referring now to FIG. 8, shown is a simplified flow diagram of a method of forming an LOD. At step 801 effective LOD construction begins with model classification, i.e. creating classes or groups of parts that are subject to similar processing for LOD construction. For example, all areas within all models that are well suited to model generalization, are grouped into one or more groups. Those groups are then regrouped based on generalizable features to support effective hierarchical LOD construction. Finally, the resulting groups are regrouped to amalgamate groups when multiple groups are representable as a single group. The same applies for groups to be decimated or eliminated. Classification is performed relying on semantics associated with each sub-model or classification, relying on material associated with a sub-model and/or based on size of each sub-model. Alternatively, other grouping methodologies are employed. Classification is performed automatically. Alternatively, classification is performed semi-automatically. Further alternatively, classification is performed manually. Yet further alternatively, a method of classification is selected depending on model structure and semantics.

For automated classification, automated grouping of sub-models is performed using certain common group semantic or metric parameters such as material, belonging to some part, size etc. Alternatively, automated classification is performed using a recursive algorithm such as an annealing process, a genetic algorithm, or a trial and error approach. Semi-automated classification typically assumes some preliminary automated grouping with further manual inspection and modification. The manual inspection is optionally prompted by the system. Manual classification involves assigning of sub-models into the different groups after visual review of sub-model shape and/or semantic parameters by an operator. Manual inspection can also be prompted by the system. Further, each and every group need not be formed with a same process. For example, some known groups are automatically classified while unknown elements are then submitted for semi-automated and/or manual classification. As a result of classification, groups—classes—of model parts are formed that are each subject to certain process for further simplification of the class for building LODs; the method of simplification is applicable to the entire class.

At step 802 model re-composition is performed. Model re-composition is where one may adjust results of automated classification uniting some classes or moving certain object from one class to another due to some considerations not covered by automated classification. For example, the processes applied to each class may fail to converge for some objects within a class and those objects may be reclassified. Alternatively, a first class and a second class may have similar processing and be better merged together.

At 803 LODs for each class formed at step 801 are produced. Class LOD construction strategy depends on class content, semantics of objects, their size and/or structure. A class related LOD is a combination of decimated or generalized objects. Some objects are completely removed for certain class related LODs.

In order to provide effective rendering from an LOD structure, "viewing rules" are implemented, for example introduced via an integer function $L_m(d)$ defined for each class m=1 . . . M where M is total number of classes created for a structured model and d is a function of distance from spectator position to particular sub-model belonging to class m.

Figure 9:
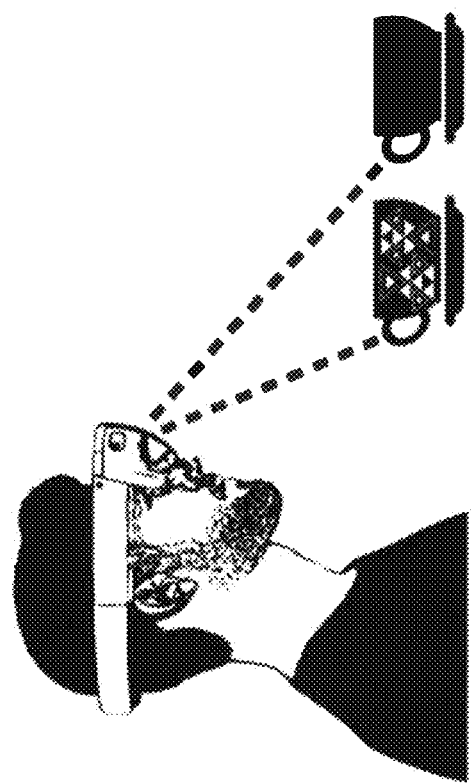
FIG. 9 is a diagram showing distance and line of sight to highlight levels of detail differences in what is displayed.

Parameter d is usually defined as an actual distance between a spectator position and the closest point of a sub-model as shown in FIG. 9. A spectator, viewer, sees a same cup model differently—with a detailed pattern or fully black—depending on a distance of the spectator from the model. This happens because two different LODs are used for cup representation. Though the distances shown are slightly different, one of skill in the art will appreciate that depending on the pattern distances may be significantly greater to result in a complete absence of pattern in the more distant object. For a more suitable experience, sub-models with dimensions comparable to the extent size of a whole structured model are decomposed in advance to separate sub-models with smaller extent. This improves communication efficiency, rendering efficiency, and class based LOD construction.

If $Q_m$ is a total number of LODs created for class m, then $L_m(d)$ returns a number q, $1<=q<=Q_m$ pointing to some LOD #q that is used for sub-models of class m being viewed from distance d. Usually the smaller d is the lower more detailed—LOD is referenced so $L_m(d)$ is monotonically increasing for different distances, d, however this may not be required. In essence, for hierarchical LOD construction, greater distance often results in selection of an LOD with same or less detail.

A family of functions $\{L_m(d)\}$ define rendering strategies and for each model class $L_m(d)$ is potentially specially constructed. Thus the rendering strategy for each LOD provides a clear, powerful, flexible, and easily adjustable mechanism for universal rendering large structured models. The rendering strategies also support variations in classification methodologies and in many future classification solutions as they may arise.

At step 804 all sub-models are united back into the unified model using a data structure that maintains information about each group—class—each sub-model belongs to in order to apply proper rendering strategies $L_m(d)$ for sub-model display.

At step 805 a so-called search engine returns to a video-buffer a subset of objects taken from various LODs in dependence upon gaze and distance from the spectator to the sub-objects within the LOD and associated $L_m(d)$ rules.

Figure 10:
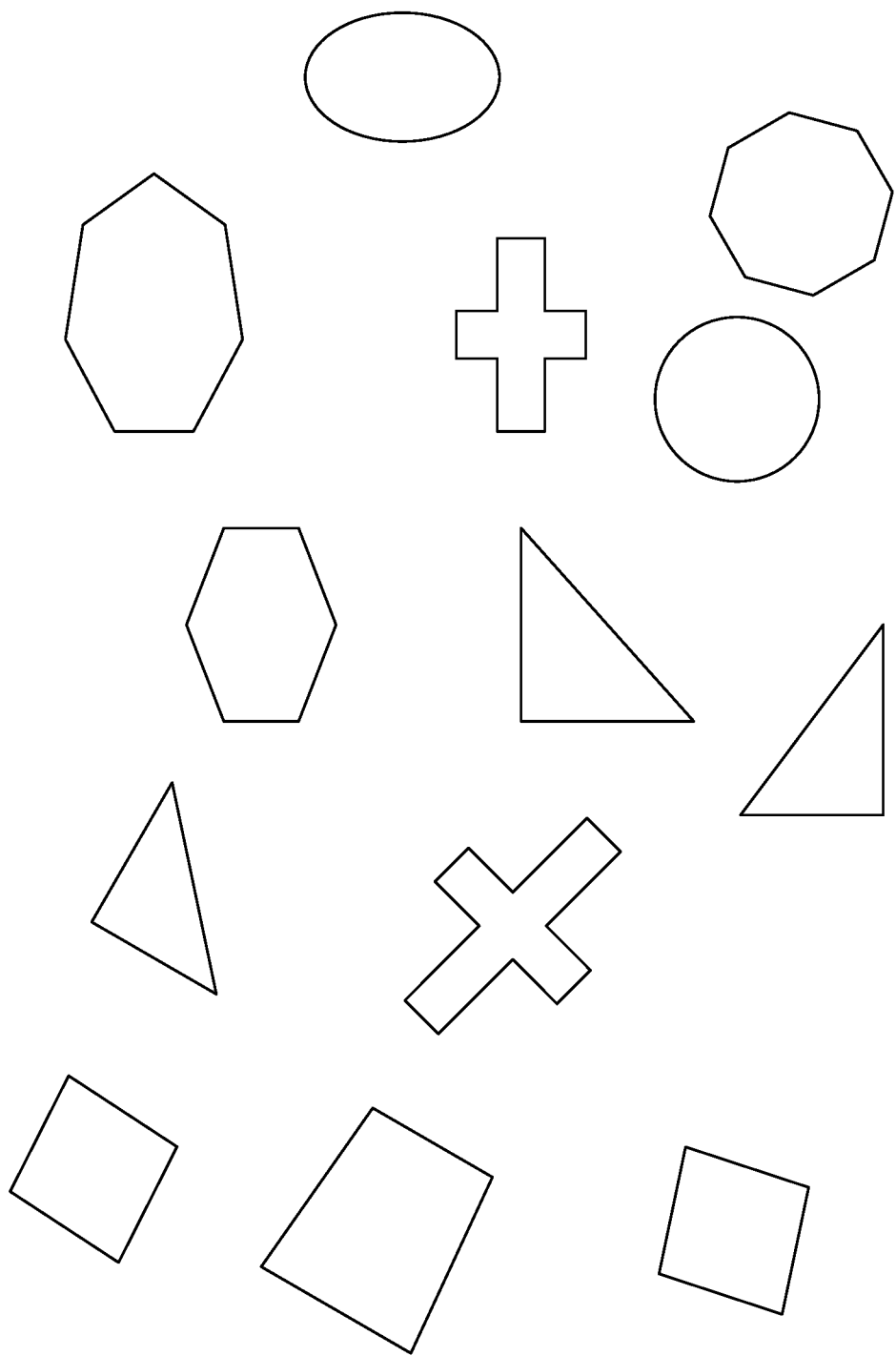
FIG. 10 shows exemplary structures within an imported original model.
Figure 11:
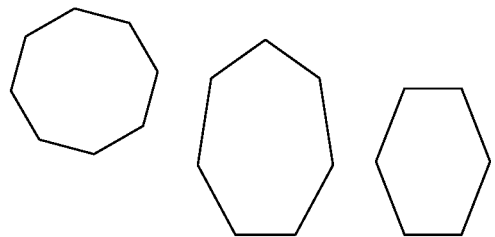
FIG. 11 shows an exemplary sub-model classification.
Figure 11:
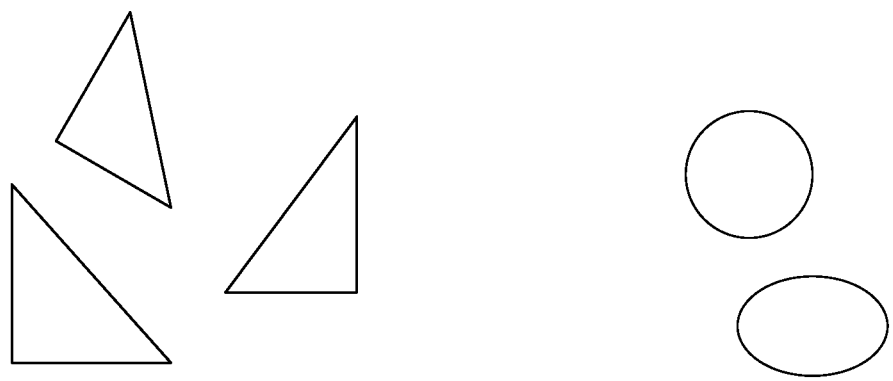
Figure 11:
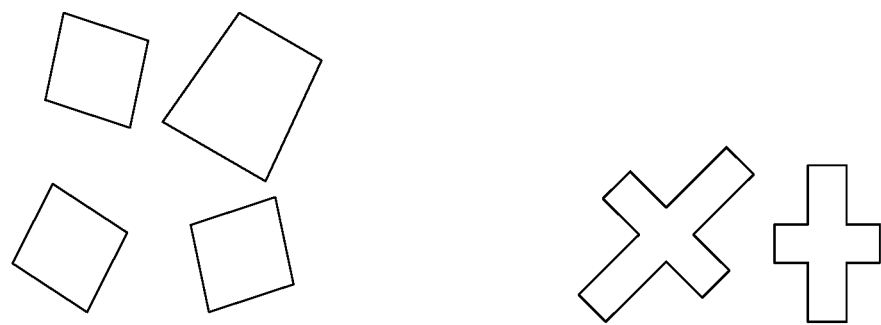
Figure 12:
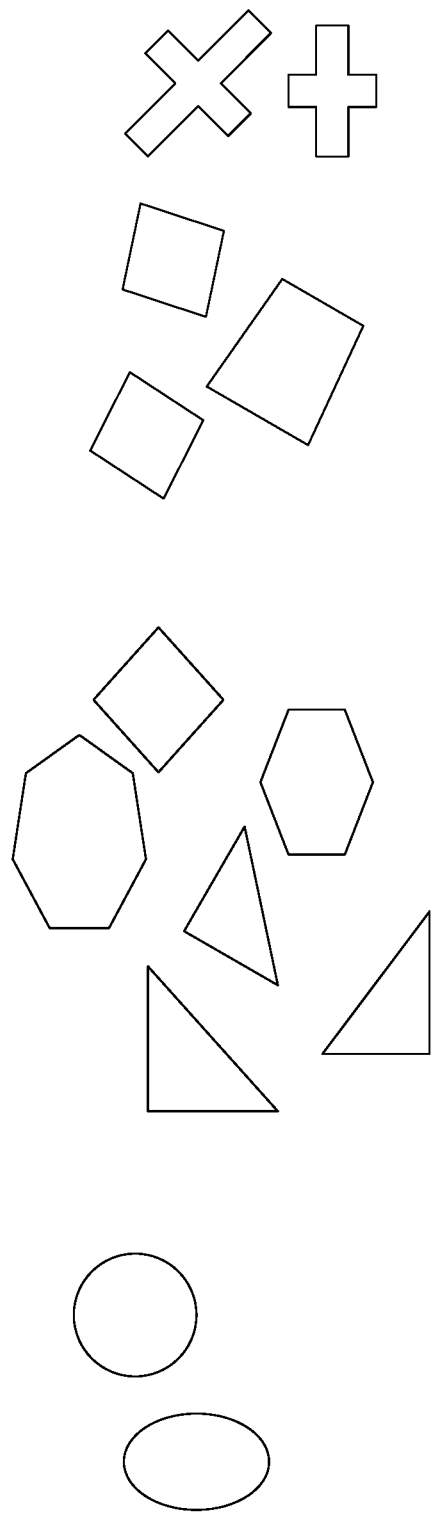
FIG. 12 shows an exemplary sub-model re-composed groups—classes.
Figure 13:
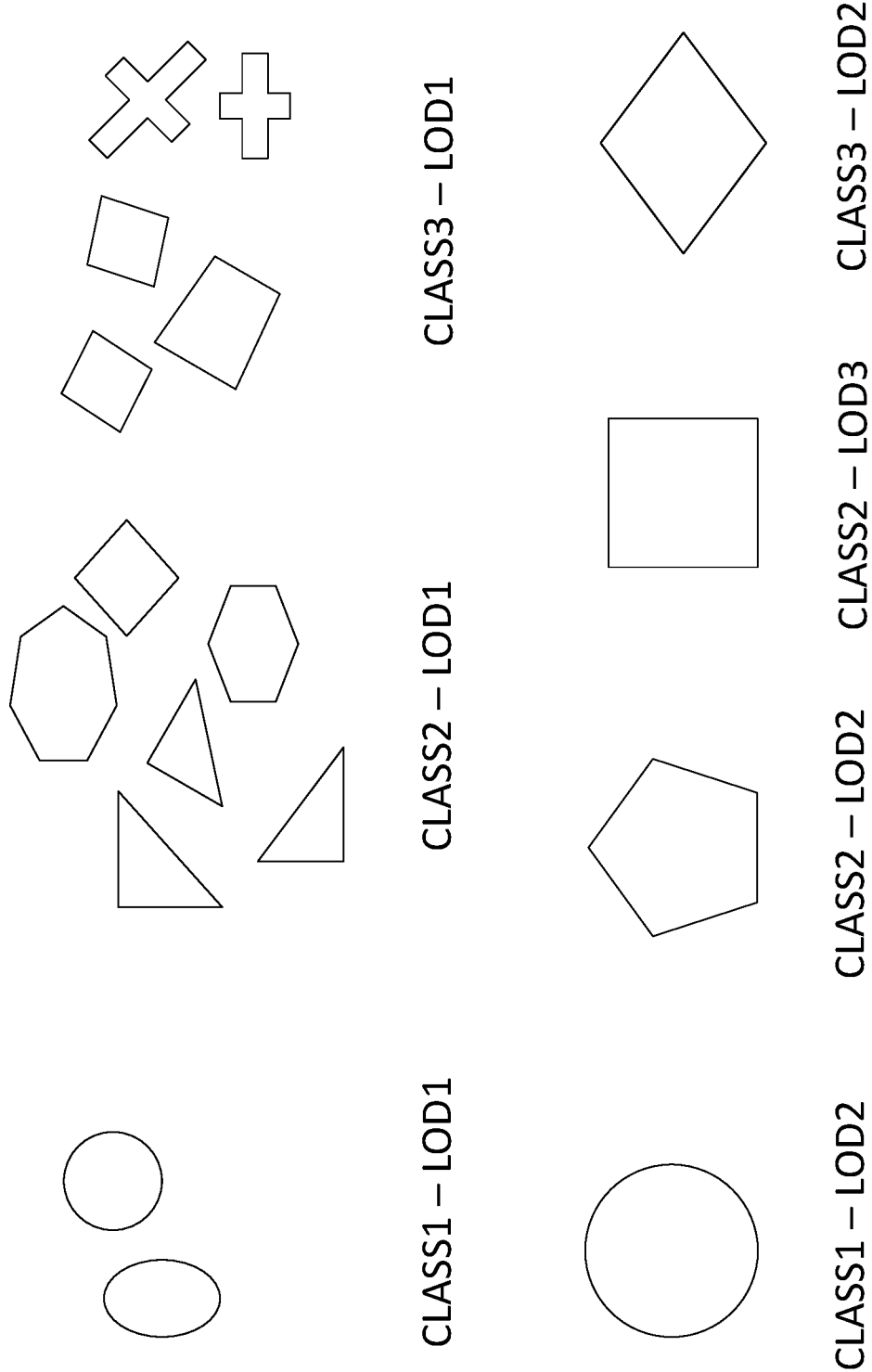
FIG. 13 shows an exemplary LOD for each group—class.

Referring to FIGS. 10 to 15, the above described method will be further explained. FIG. 10 shows the imported original model containing a variety of sub-models of different shapes. FIG. 11 shows the sub models classified into 5 groups—classes—including the following: quadrilaterals, crosses, ellipses, triangles, and generic polygons. FIG. 12 shows recomposed groups—classes—such that only 3 groups—classes—result since quadrilaterals were united with crosses and polygons with triangles. Referring to FIG. 13, shows is a simplified LOD for each group—class. LODs are constructed for each class independently. Class 1 is shown as a circle from a distance but up close as each specific member of the class. Class 2 is shown as a diamond from a distance, as a pentagon from a moderate distance and then as each specific member of the class up close. Class 3 is shown as a square from a distance and as each specific member of the class from up close. Because of functions of distance $L_1(d)$, $L_2(d)$, $L_3(d)$, each LOD and each strategy may be constructed independently.

Figure 14:
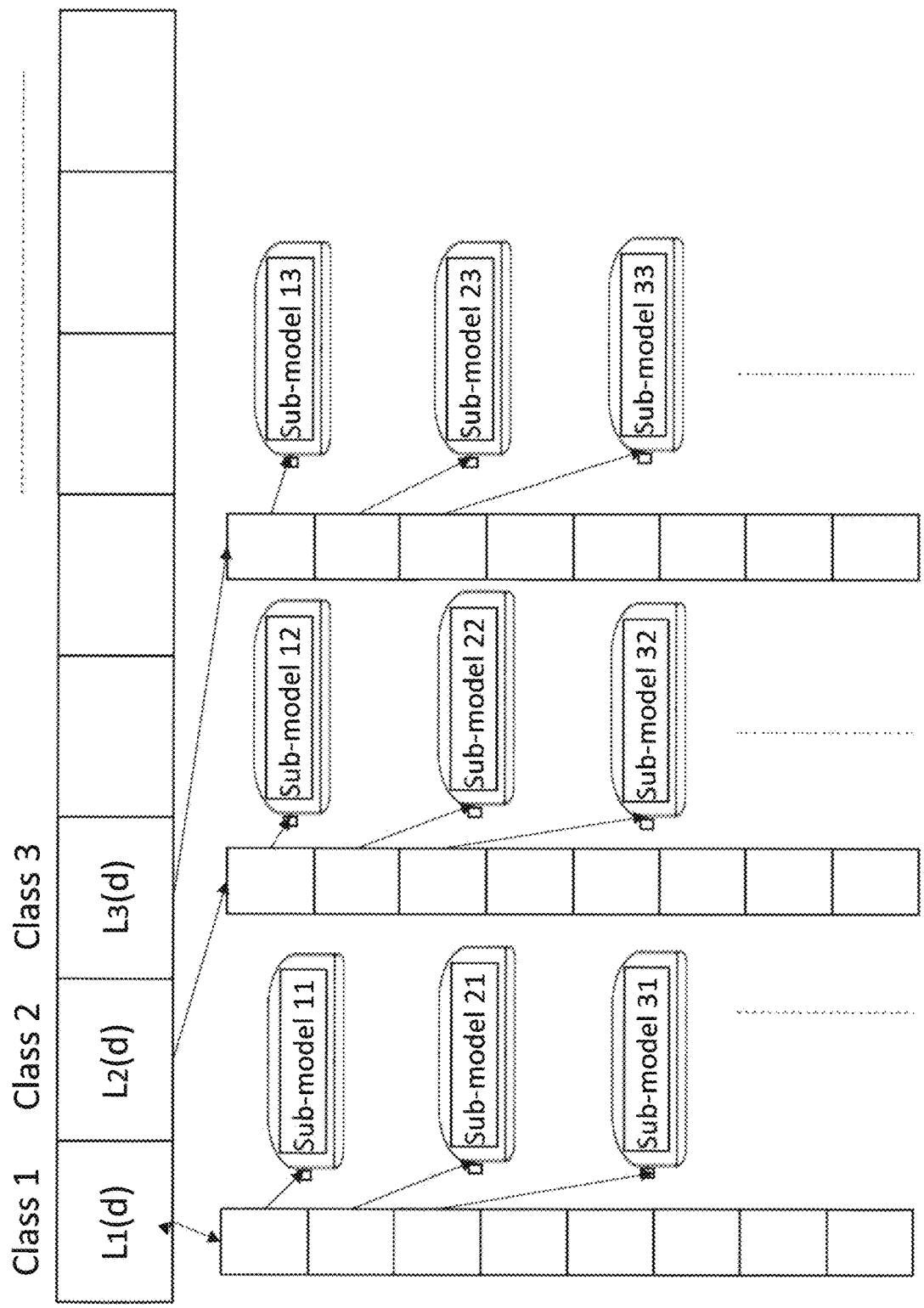
FIG. 14 shows a simplified data storage architecture for the LOD structure referencing the classified model.

Shown in FIG. 14, after creating hierarchical LODs for each class a data structure is implemented to facilitate LOD selection and effective LOD communication, processing, and rendering. If a sub-model belongs to class k then $L_k(d)$ strategy is relied upon.

Figure 15:
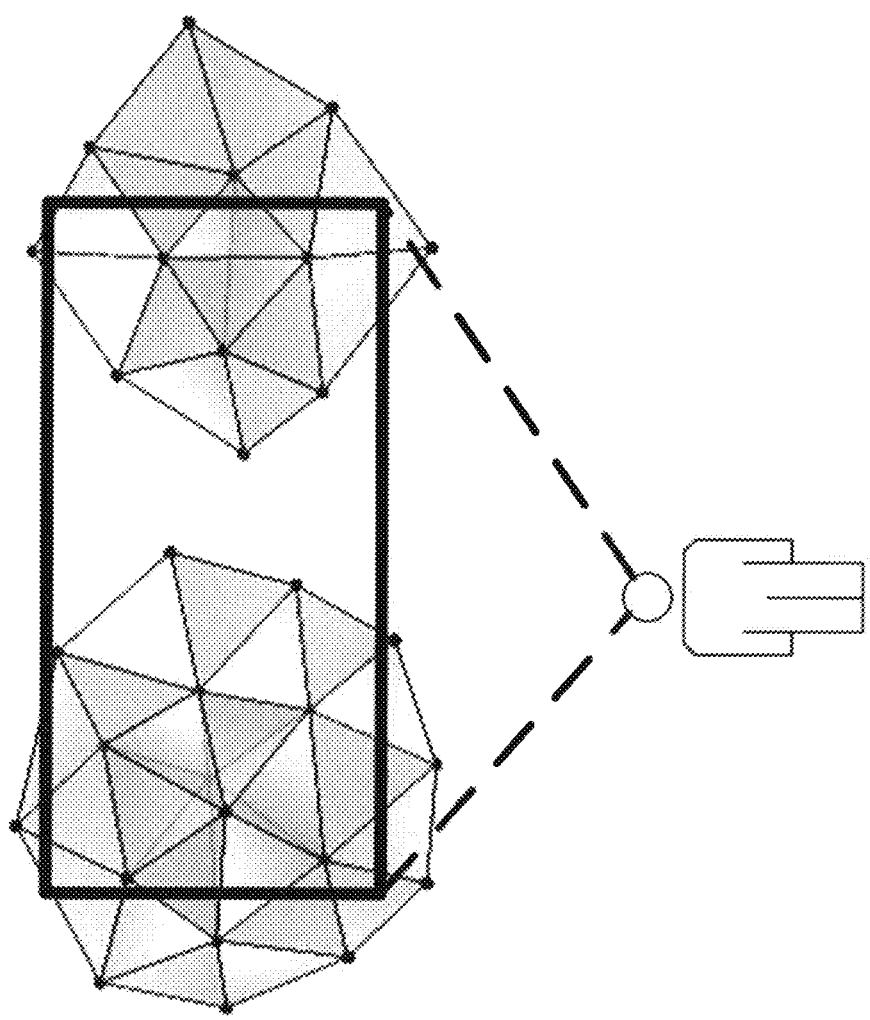
FIG. 15 is a simplified spatial diagram showing facet selection and data from within an LOD hierarchy selection being dependent on distance and gaze.

Referring to FIG. 15, when the spectator changes position, depending on visibility of each sub-model and its distance from the spectator a proper set of facets, or data, is selected and communicated to a front-end device in the form of a headset. The facets or data are rendered and displayed on the headset for the spectator.

Though the classes and LODs shown are extremely simplified, a same process is applicable to classes with more items, more complexity, etc. The process herein described is similar to an iterative or recursive process and true recursive or iterative processes are applicable to the method, should one be chosen.

Other methods of grouping data and other methods for implementing hierarchical levels are supported. Further, though hierarchical LOD structures are described, the structure need not be truly hierarchical with a same gaze line resulting in a visible point falling within completely different classes depending on a distance from the visible point. The explanation of the LOD construction is for ease of comprehension, but each and every visible point need not fall within a universally hierarchical LOD structure such that moving away from said point moves up the hierarchical LOD structure and moving toward it moves down said structure.

Numerous other embodiments may be envisaged without departing from the spirit or scope of the invention.

What is claimed is:

1. A method comprising:
    providing a first model comprising three-dimensional spatial information for use in being displayed on a display device;
    classifying objects within the first model to form groups of objects, objects within a same group for being processed with a substantially similar process;
    building a class LOD structure for each group, the class LOD structure built using the substantially similar process for the class and the LOD structure for representing each object within the class for supporting rendering thereof;
    defining a rendering strategy for each Class, the rendering strategy for rendering each object within the class based on data within the LOD structure and in dependence upon a gaze direction of a spectator and a location of the spectator;
    merging the class LODs to form an LOD structure for the first model; and
    storing the LOD structure in a retrievable form for having data retrieved therefrom based on a provided location and gaze direction.

2. A method according to claim 1 wherein the first model comprises multiple types of image data.

3. A method according to claim 2 wherein the multiple types include at least two of raster data, mesh data; point cloud data; graphs; and CAD data.

4. A method according to claim 2 comprising semantic data describing at least a portion of the image data.

5. A method according to claim 1 wherein classifying object comprises classifying objects for processing to simplify the objects to result in hierarchical LOD representations of objects within a class.

6. A method according to claim 5 wherein processing to simplify comprises at least one of decimation, generalisation, substitution, and elimination.

7. A method according to claim 6 wherein classifying objects comprises classifying objects based on form.

8. A method according to claim 6 wherein classifying objects comprises classifying objects based on structure.

9. A method according to claim 6 wherein classifying objects comprises classifying objects based on semantic descriptors.

10. A method according to claim 1 wherein merging comprises:
    automatically merging the class LOD structures for each class to a viewable model represented by data structures containing an array of containers having a dimension equal to a number of classes and wherein a data structure relating to each class contains references to all sub-models belonging to said class.

11. A method comprising:
    providing a first model represented in a first LOD data structure;
    receiving a spectator location and a spectator gaze direction of a user of a front-end device;
    based on the spectator location and spectator gaze direction selecting a subset of LODs from the first LOD data structure relying on a predefined set of integer functions that define rendering strategies, each for a subset of the LODs reflecting each class, the subset of LODs selected in part based on a distance from the spectator location to an object within said class;
    selecting a subset of facets from the subset of LODs depending on spectator position and related sub-model visibility for use in rendering of a scene on the front-end display; and
    providing the subset of selected facets for display on the front-end device.

12. A method according to claim 11 wherein the first LOD data structure comprises a plurality of classes and class LODs relating to each of said plurality of classes, at least some of the class LODs hierarchical in nature.

13. A method according to claim 12 wherein processing is performed to determine facets necessary for displaying an image on the front-end device and wherein only data related to those facets are communicated to the front-end display.

14. A method according to claim 12 wherein processing is performed to determine class LODs necessary for displaying an image on the front-end device and wherein only data related to those class LODs are communicated to the front-end display.

15. A method according to claim 11 wherein the front-end device comprises a heads-up display.

16. A method comprising:
providing a first model comprising three-dimensional spatial information for use in being displayed on a display device;
classifying objects within the first model having sub-models to form groups of objects, objects within a same group for being processed with a substantially similar process;
building a class LOD structure for each group, the class LOD structure built using the substantially similar process for the class and the LOD structure for representing each object within the class for supporting rendering thereof;
defining a rendering strategy for each Class, the rendering strategy for rendering each object within the class based on data within the LOD structure and in dependence upon a gaze direction of a spectator and a location of the spectator;
merging the class LODs to form an LOD structure for the first model;
storing the LOD structure in a retrievable form for having data retrieved therefrom based on a provided location and gaze direction;
receiving a spectator location and gaze direction;
based on the spectator location and gaze direction selecting a subset of LODs from the LOD structure relying on a predefined set of integer functions that define rendering strategies, each for a subset of the class LODs reflecting each class, the subset of LODs selected in part based on a distance from the spectator location to an object within said class;
selecting a subset of facets from the subset of LODs depending on spectator position and related to visibility of an encompassing sub-model for use in rendering of a scene on a front-end display; and
transmitting the subset of selected facets for display on the front-end device.

17. A method according to claim 16 wherein the front-end device comprises a heads-up display.

18. A method comprising:
providing a first model comprising three-dimensional spatial information for use in being displayed on a display device;
classifying objects within the first model having sub-models to form groups of objects, objects within a same group for being processed with a substantially similar process;
building a class LOD structure for each group, the class LOD structure built using the substantially similar process for the class and the LOD structure for representing each object within the class for supporting rendering thereof;
defining a rendering strategy for each Class, the rendering strategy for rendering each object within the class based on data within the LOD structure and in dependence upon a gaze direction of a spectator and a location of the spectator;
merging the class LODs to form an LOD structure for the first model;
storing the LOD structure in a retrievable form for having data retrieved therefrom based on a provided location and gaze direction;
receiving a spectator location and gaze direction;
based on the spectator location and gaze direction selecting a subset of LODs from the LOD structure relying on a predefined set of integer functions that define rendering strategies, each for a subset of the class LODs reflecting each class, the subset of LODs selected in part based on a distance from the spectator location to an object within said class;
selecting a subset of facets from the subset of LODs depending on spectator position and related to visibility of an encompassing sub-model for use in rendering of a scene on a front-end display; and
providing the subset of selected facets for display on the front-end device.

19. A method according to claim 18 comprising: displaying an image on the front-end device.

* * * * *